(12) United States Patent
Leshik et al.

(10) Patent No.: US 8,124,163 B2
(45) Date of Patent: Feb. 28, 2012

(54) READY-TO-EAT FUDGE DESSERT

(75) Inventors: Richard R. Leshik, Brookfield, CT (US); Meg Harris, Tarrytown, NY (US)

(73) Assignee: Kraft Foods Global Brands LLC, Northfield, IL (US)

( * ) Notice: Subject to any disclaimer, the term of this patent is extended or adjusted under 35 U.S.C. 154(b) by 649 days.

(21) Appl. No.: 11/385,202

(22) Filed: Mar. 21, 2006

(65) Prior Publication Data

US 2006/0159836 A1 Jul. 20, 2006

Related U.S. Application Data

(63) Continuation of application No. 10/347,175, filed on Jan. 17, 2003.

(51) Int. Cl.
*A23G 3/00* (2006.01)
(52) U.S. Cl. ......... 426/659; 426/519; 426/521; 426/660
(58) Field of Classification Search .............. 426/659, 426/306, 593, 660, 589, 531, 631, 519, 521
See application file for complete search history.

(56) References Cited

U.S. PATENT DOCUMENTS

| | | | |
|---|---|---|---|
| 3,793,464 A * | 2/1974 | Rusch et al. ..................... | 426/89 |
| 4,808,334 A * | 2/1989 | Ezaki et al. ..................... | 516/54 |
| 4,874,618 A | 10/1989 | Seaborne et al. | |
| 4,952,414 A | 8/1990 | Kaufman et al. | |
| 5,011,704 A * | 4/1991 | Smagula et al. ............... | 426/660 |
| 5,120,566 A | 6/1992 | Baba et al. | |
| 5,417,990 A | 5/1995 | Soedjak et al. | |
| 5,468,509 A | 11/1995 | Schlup et al. | |
| 5,518,744 A | 5/1996 | Kaeser et al. | |
| 5,965,179 A | 10/1999 | Ducret et al. | |
| 5,989,619 A * | 11/1999 | Zumbe et al. ................. | 426/631 |
| 6,159,526 A | 12/2000 | Morikawa et al. | |
| 6,165,540 A * | 12/2000 | Traitler et al. ................. | 426/631 |
| 6,203,831 B1 | 3/2001 | Eder et al. | |
| 6,231,902 B1 | 5/2001 | Grassler et al. | |
| 6,537,602 B1 * | 3/2003 | Kawabata et al. ............ | 426/283 |
| 6,835,406 B1 * | 12/2004 | Wurzel et al. ................. | 426/593 |

OTHER PUBLICATIONS

Soy lecithin fact sheet, composition.*
Lecithin, Dec. 7, 2000.*
Skim or Whole, Apr. 1, 1991.*

* cited by examiner

*Primary Examiner* — Rena Dye
*Assistant Examiner* — Preston Smith
(74) *Attorney, Agent, or Firm* — Fitch, Even, Tabin & Flannery

(57) ABSTRACT

The present invention provides a water containing, heat processable firm RTE fudge dessert. The RTE fudge dessert of this invention is prepared from an emulsified blend of water, fat, milk, lecithin, and a water binder. Sweeteners and/or flavorings may be added to provide the desired level of sweetness or desired flavor profile. A smooth firm fudge candy textured dessert comprising about 20 to about 60 percent water, about 15 to about 45 percent fat, about 1 to about 15 percent non-fat dry milk (or equivalent milk protein), about 0.1 to about 3 percent lecithin, and about 0.1 to about 20 percent water binder is provided.

23 Claims, No Drawings

READY-TO-EAT FUDGE DESSERT

CROSS REFERENCE TO RELATED APPLICATION

This application is a continuation of U.S. patent application Ser. No. 10/347,175, filed on Jan. 17, 2003.

FIELD OF THE INVENTION

A ready-to-eat (RTE) firm fudge dessert that is capable of being heat pasteurized or sterilized is prepared from a water-based formulation of milk, lecithin, fat, and a water binder.

BACKGROUND

Ready-to-eat, pre-packaged desserts (e.g., pudding, gelatine, mousse, and the like) are currently available in single-serving cups as aseptic, shelf-stable products, pasteurized products, or commercially-sterile refrigerated products. Such desserts have become widely accepted because they can be stored at room temperature or under refrigeration and consumed without further preparation. To forestall microbiological contamination, components of the shelf-stable, ready-to-eat desserts are often processed at ultra-high temperatures (UHT) prior to packaging. For example, it is well-known that packaging foods under aseptic conditions can extend the shelf-life of the product at room temperature or under refrigeration.

However, certain dessert components, such as chocolate products, must be formulated with high fat and with minimal water content. The presence of significant amount of water generally make processing the product difficult and tends to result in a less than desirable texture (i.e., not smooth and firm). Such products are, therefore, difficult to render safe for long shelf lives under refrigerated or room temperature storage conditions. See, e.g., U.S. Pat. No. 6,203,831 to Eder et al. (multi-layer chocolate/mousse dessert); U.S. Pat. No. 6,231,902 to Grassler et al. (chocolate pieces in mousse). The addition of water to chocolate has been attempted (see, e.g., U.S. Pat. Nos. 6,165,540, 6,159,526, and 5,965,179). The resulting products are not pasteurized or sterilized and, therefore, are generally not suitable for human consumption if the water activity is above about 0.85 or if they are to be layered with a high water activity component (e.g., pudding). Also it would be expected that heat processing (i.e., pasteurization or sterilization) to destroy undesirable microorganisms would be destructive to the final taste and texture of these chocolate formulations. In order to offer a diverse selection of desserts to the consumer, it is desirable to offer chocolate fudge as a ready-to-eat dessert, or as a component of a ready-to-eat dessert combination, with other such components as pudding, mousse, whip cream, sauce, and the like.

SUMMARY OF THE INVENTION

The present invention provides a water containing, heat processable firm RTE fudge dessert. The RTE fudge dessert of this invention is prepared from an emulsified blend of water, fat, milk, lecithin, and a water binder. Sweeteners and/or flavorings may be added to provide the desired level of sweetness or desired flavor profile. The fat used in the present invention should have a melting point at least about 20° F. higher than the planned storage conditions; preferably the fat has a melting point of about 90° F. or higher and preferably a melting point of about 98 to about 105° F. A smooth firm fudge candy textured dessert comprising about 20 to about 60 percent water, about 15 to about 45 percent fat, about 1 to about 15 percent non-fat dry milk (or equivalent milk protein), about 0.1 to about 3 percent lecithin, and about 0.1 to about 20 percent water binder is provided.

The present invention provides a method for preparing a heat processable fudge comprising: (a) homogenizing a blend comprising about 20 to about 60 percent water, about 15 to about 45 percent fat, about 1 to about 15 percent non-fat dry milk or equivalent milk protein, about 0.1 to about 3 percent lecithin, and about 0.1 to about 20 percent water binder to form an emulsion; (b) heating the emulsion at a temperature and time sufficient for pasteurization; and (c) allowing the emulsion to cool to form a firm, smooth fudge.

The present invention also provides a method for preparing an ultra high temperature processable chocolate fudge comprising: (a) homogenizing a blend comprising about 20 to about 60 percent water, about 15 to about 45 percent fat, about 1 to about 15 percent non-fat dry milk or equivalent milk protein, about 0.1 to about 3 percent lecithin, and about 0.1 to about 20 percent cocoa to form an emulsion; (b) heating the emulsion under ultra high temperature conditions of about 250 to about 300° F. for at least about 15 seconds; and (c) allowing the emulsion to cool to form a firm, smooth chocolate fudge, wherein the emulsion has a pH of about 6.4 to about 7.

The present invention also provides a method for preparing an ultra high temperature processable non-chocolate fudge comprising: (a) homogenizing a blend comprising about 20 to about 60 percent water, about 15 to about 45 percent fat, about 1 to 15 percent non-fat dried milk or equivalent milk protein, about 0.1 to about 3 percent lecithin, about 0.1 to about 5 percent modified starch, 0 to about 45 percent sugar, 0 to about 1 percent artificial sweetener, and 0 to about 1 percent flavoring; (b) heating the emulsion under ultra high temperature conditions of about 250 to about 300° F. for at least about 15 seconds; and (c) allowing the emulsion to cool to form a firm, smooth non-chocolate fudge, wherein the emulsion has a pH of about 6.4 to about 7.

The present invention also provides a heat processable fudge comprising about 20 to about 60 percent water, about 15 to about 45 percent fat, about 1 to about 15 percent non-fat dry milk or equivalent milk protein, about 0.1 to about 3 percent lecithin, and about 0.1 to about 20 percent water binder, wherein the heat processable fudge is pasteurized and has a firm, smooth fudge at room temperature.

DETAILED DESCRIPTION

The present invention provides a water containing, heat processable firm RTE fudge dessert. The RTE fudge dessert of this invention is prepared from an emulsified blend of water, milk, fat, lecithin, and a water binder. Sweeteners and/or flavorings may be added to provide the desired level of sweetness or desired flavor profile. The fat used in the present invention should have a melting point at least about 20° F. higher than the planned storage conditions; preferably the fat has a melting point of about 90° F. or higher and preferably a melting point of about 98 to about 105° F. A smooth firm fudge candy textured dessert comprising about 20 to about 60 percent water, about 15 to about 45 percent fat, about 1 to about 15 percent non-fat dry milk (or equivalent milk protein), about 0.1 to about 3 percent lecithin, and about 0.1 to about 20 percent water binder is provided. By preparing an water and fat emulsion using these ingredients, one can surprisingly create a dessert having a firm fudge/candy-like texture but with a relatively high water content and a high water activity. The dessert can surprisingly be heat pasteurized or sterilized under ultra-high temperature (UHT) conditions and is useful as a ready-to-eat dessert either alone or in combination with other dessert components (e.g., pudding, mousse, and the like).

To provide a ready-to-eat dessert, especially when combined with other components such as pudding, mousse, and the like, the fudge according to the present invention requires a long shelf-life. To achieve a long shelf-life, the fudge as prepared in this invention can be pasteurized or sterilized at ultra-high temperatures.

A preferred chocolate fudge according to the invention is made by batching about 20 to about 60 percent water, about 15 to about 45 percent fat, about 1 to 15 percent non-fat dried milk (NFDM or equivalent milk protein), about 0.1 to about 3 percent lecithin, about 0.5 to about 20 percent cocoa as the water binder, 0 to about 45 percent sugar, 0 to about 1 percent artificial sweetener, and 0 to about 1 percent flavoring. Preferably the pH is about 6.4 to about 7; addition of food grade acids or bases as appropriate can be used to adjust the pH. The ingredients are heated to above the melting point of the fat with good mixing, homogenized at a pressure of at least about 1000 psi, and cooked to a temperature and for a time sufficient for pasteurization (e.g., 180° F. for about 15 seconds) or more preferably ultra temperature pasteurization (e.g., 280° F. for about 15 seconds). The pasteurized or UHT pasteurized product is then cooled (typically to a temperature of about 75° F. or higher and preferably about 75 to about 125° F.) and packaged. Preferably both pasteurization and cooling are carried out in a scraped surface heat exchanger. Preferably the pasteurized product is packed in a liquid state alone or in combination with other dessert components (e.g., layered with a suitable pudding) in a dessert cup or other suitable container and then cooled to solidify. Upon cooling the mixture sets to form a firm, smooth fudge. More preferably, the chocolate fudge comprises about 45 to about 55 percent water, about 20 to about 30 percent fat, about 2 to 10 percent non-fat dried milk (NFDM or equivalent milk protein), about 0.2 to about 1.5 percent lecithin, about 5 to about 15 percent cocoa as the water binder, about 5 to about 15 percent sugar, 0 to about 0.3 percent artificial sweetener, and 0 to about 0.3 percent flavoring and has a pH of about 6.6 to about 6.8.

A non-chocolate fudge according to the invention is made by batching about 20 to about 60 percent water, about 15 to about 45 percent fat, about 1 to 15 percent non-fat dried milk (NFDM or equivalent milk protein), about 0.1 to about 3 percent lecithin, about 0.1 to about 5 percent modified starch as the water binder, 0 to about 45 percent sugar, 0 to about 1 percent artificial sweetener, and 0 to about 1 percent flavoring. Preferably the pH is about 6.4 to about 7; addition of food grade acids or bases as appropriate can be used to adjust the pH. The ingredients are heated to above the melting point of the fat with good mixing, homogenized at a pressure of at least about 1000 psi, and cooked to a temperature and for a time sufficient for pasteurization (e.g., 180° F. for about 15 seconds) or more preferably ultra temperature pasteurization (e.g., 280° F. for about 15 seconds). The pasteurized or UHT pasteurized product is then cooled (typically to a temperature of about 75° F. or higher and preferably about 75 to about 125° F.) and packaged. Preferably both pasteurization and cooling are carried out in a scraped surface heat exchanger. Preferably the pasteurized product is hot packed alone or in combination with other dessert components (e.g., layered with a suitable pudding) in a dessert cup or other suitable container. Upon cooling the mixture sets to form a firm, smooth fudge. More preferably, the non-chocolate fudge comprises about 45 to about 55 percent water, about 20 to about 30 percent fat, about 1 to 10 percent non-fat dried milk (NFDM or equivalent milk protein), about 0.2 to about 1.5 percent lecithin, about 2 to about 4 percent modified starch as the water binder, about 10 to about 25 percent sugar, 0 to about 0.5 percent artificial sweetener, and 0 to about 0.5 percent flavoring and has a pH of about 6.6 to about 6.8.

Optional ingredients may be used. Examples of optional ingredients include high-intensity artificial sweeteners, such as saccharin, Sucralose™, Acesulfame K™, and Aspartame™, and natural sweeteners such as fructose, glucose, dextrose, corn syrup, corn syrup solids, honey, and the like. Preferred water binders for use in the present invention include cocoa for chocolate type fudges and modified starches for non-chocolate type fudges. If desired, other known water binders can be used. Examples of such other water binders include starches, gums, fibers, maltodextrin, and the like. Mixtures of such water binders can be used if desired.

The RTE fudge desserts of this invention may be pasteurized or sterilized at ultra high temperatures. Typically such UHT treatment is carried out under high temperatures and short time conditions (e.g., about 280° F. for about 15 seconds) in order to kill potentially dangerous microorganisms. Other temperature and time profiles normally used for pasteurization and/or sterilization can also be used so long as they provide the desired protection. Generally the UHT processed RTE fudge desserts of this invention have shelf lives of greater than about 6 months at ambient temperatures for aseptically packaged products and greater than about 3 months under refrigerated conditions for non-aseptically packaged products.

The invention is further described by the following examples. It should be recognized that variations based on the inventive features disclosed herein are within the skill of the ordinary artisan, and that the scope of the invention should not be limited by the examples. To properly determine the scope of the invention, an interested party should consider the claims herein, and any equivalent thereof. In addition, all citations herein are incorporated by reference, and unless otherwise expressly stated, all percentages are by weight.

EXAMPLE 1

A series of model chocolate fudge formulations were make to demonstrate the importance of the key ingredients. The formulations were as follows:

| | Sample | | | | |
| --- | --- | --- | --- | --- | --- |
| | 1 | 2 | 3 | 4 | 5 |
| Water (%) | 50.6 | 50.6 | 50.6 | 50.6 | 50.6 |
| Coconut Palm Kernal Oil (%) | 25 | 25 | 25 | 25 | 25 |
| Cocoa (%) | 9.8 | 9.8 | 9.8 | 9.8 | 9.8 |
| Sugar (%) | 8.4 | 8.6 | 13.4 | 9.4 | 9.6 |
| Lecithin (%) | 1 | 1 | 1 | 0 | 0 |
| NFDM (%) | 5 | 5 | 0 | 0 | 0 |
| Sodium Steroyl Lactylate (%) | 0.2 | 0 | 0.2 | 0.2 | 0 |

In each case, the water was heated to about 125° F. and the ingredients were added in the following order (if included in the formulation): lecithin, NFDM, melted oil (melting point about 103° F.), and then remaining ingredients. The mixture was then mixed until well blended. The mixture was then homogenized at 2500 psi followed by pasteurization at 180°

F. for about 60 seconds. The resulting mixture was then cooled to 100° F., packaged, and then refrigerated.

After storage under refrigerated conditions overnight, Samples 1 and 2 (shaded in the above table) produced a very good, firm, and smooth fudge-like texture approaching the qualities of a fudge candy whereas Samples 3-5 produced unacceptable products which were too soft. The gel strengths of Samples 1-5 products were 1804, 1275, 106, 81, 146 units, respectively. For comparison, Jell-O® RTE Vanilla Pudding and Jell-O® Gels are expected to have gel strengths of about 12 and 30 units, respectively. Samples 1 and 2 provided a strong degree of firmness and the importance of lecithin and NFDM with regard to final texture. The cocoa used had sufficient water binding properties to provide the desired fudge-like texture.

EXAMPLE 2

A series of model non-chocolate fudge formulations were make to demonstrate the importance of the key ingredients. The formulations were as follows:

| | Sample | | | | | | | | |
|---|---|---|---|---|---|---|---|---|---|
| | 1 | 2 | 3 | 4 | 5 | 6 | 7 | 8 | 9 |
| Water (%) | 51 | 51 | 51 | 51 | 51 | 51 | 51 | 51 | 51 |
| Coconut Palm Kernal Oil (%) | 25 | 25 | 25 | 25 | 25 | 20 | 25 | 25 | 25 |
| Sugar (%) | 20 | 16 | 15 | 18 | 15.5 | 20 | 18.5 | 19 | 19 |
| Lecithin (%) | 1 | 0 | 1 | 1 | 0.5 | 1 | 1.5 | 2 | 0 |
| NFDM (%) | 0 | 5 | 5 | 2 | 5 | 5 | 1 | 0 | 2 |
| Modified Starch (%) | 3 | 3 | 3 | 3 | 3 | 3 | 3 | 3 | 3 |

Samples were prepared as described in Example 1.

After storage under refrigerated conditions overnight, Samples 3-7 (shaded in the above table) produced very good, firm, and smooth fudge-like texture approaching the qualities of a fudge candy whereas Samples 1, 2, 8, and 9 produced unacceptable products which were too soft. This example again shows the importance of lecithin and NFDM in achieving the desired texture. The modified starch and increased sugar levels had sufficient water binding properties to provide the desired fudge-like texture.

EXAMPLE 3

Ingredients (see Table below) for this UHT processed chocolate fudge were combined and then heated to about 125° F. with good mixing, homogenized at about 2500 psi, cooked in a scraped surface heat exchanger to about 280° F. for about 15 seconds, and then cooled in a scraped surface heat exchanger to about 80° F. The cooled and sterilized mixture was poured into cups and then allowed to cool in the cup. When cooled, the mixture sets to provide a smooth, firm fudge candy dessert. The dessert can be packaged alone or can be combined with a dissimilar textured pudding to form a contrasting textured layer.

TABLE

| Fudge Formulation | |
|---|---|
| Ingredient | Amount (%) |
| Water | 50.0 |
| Fat | 25.0 |
| Cocoa | 10.0 |
| Sugar | 8.6 |
| Non-fat dried milk | 5.0 |
| Lecithin | 1.0 |
| Sucralose | 0.03 |
| Flavor | 0.1 |
| Sodium stearoyl lactylate | 0.2 |
| Phosphoric acid | 0.08 |

We claim:

1. A method for preparing a heat processable fudge comprising: (a) homogenizing a blend comprising about 45 to about 60 percent water, about 15 to about 45 percent fat, about 1 to about 15 percent non-fat dry milk or equivalent milk protein, about 0.1 to about 3 percent lecithin, and about 0.1 to about 20 percent water binder to form an emulsion; (b) heating the emulsion at a temperature and time sufficient for pasteurization; and (c) allowing the emulsion to cool to form a solid fudge comprising from about 45 to about 60 percent water.

2. The method according to claim 1, wherein the water binder is selected from the group consisting of cocoa, starch, modified starch, gums, fibers, maltodextrin, and combinations thereof.

3. The method according to claim 1, wherein the fudge is a chocolate fudge; wherein the blend contains about 45 to about 60 percent water, about 15 to about 45 percent fat, about 1 to 15 percent non-fat dried milk or equivalent milk protein, about 0.1 to about 3 percent lecithin, about 0.5 to about 20 percent water binder, 0 to about 45 percent sugar, 0 to about 1 percent artificial sweetener, and 0 to about 1 percent flavoring; wherein the water binder is cocoa; and wherein the emulsion has a pH of about 6.4 to about 7.

4. The method according to claim 3, wherein the blend contains about 45 to about 55 percent water, about 20 to about 30 percent fat, about 2 to 10 percent non-fat dried milk or equivalent milk protein, about 0.2 to about 1.5 percent lecithin, about 5 to about 15 percent water binder, about 5 to about 15 percent sugar, 0 to about 0.3 percent artificial sweetener, and 0 to about 0.3 percent flavoring; and wherein the emulsion has a pH of about 6.6 to about 6.8.

5. The method according to claim 1, wherein the fudge is a non-chocolate fudge; wherein the blend contains about 45 to about 60 percent water, about 15 to about 45 percent fat, about 1 to 15 percent non-fat dried milk or equivalent milk protein, about 0.1 to about 3 percent lecithin, about 0.1 to about 5 percent water binder, 0 to about 45 percent sugar, 0 to about 1 percent artificial sweetener, and 0 to about 1 percent flavoring; wherein the water binder is a modified starch; and wherein the emulsion has a pH of about 6.4 to about 7.

6. The method according to claim 5, wherein the blend contains about 45 to about 55 percent water, about 20 to about 30 percent fat, about 1 to 10 percent non-fat dried milk or equivalent milk protein, about 0.2 to about 1.5 percent lecithin, about 2 to about 4 percent water binder, about 10 to about 25 percent sugar, 0 to about 0.5 percent artificial sweetener, and 0 to about 0.5 percent flavoring; and wherein the emulsion has a pH of about 6.6 to about 6.8.

7. A method for preparing an ultra high temperature processable chocolate fudge comprising: (a) homogenizing a blend comprising about 45 to about 60 percent water, about 15 to about 45 percent fat, about 1 to about 15 percent non-fat dry milk or equivalent milk protein, about 0.1 to about 3 percent lecithin, and about 0.1 to about 20 percent cocoa to form an emulsion; (b) heating the emulsion under ultra high temperature conditions of about 250 to about 300° F. for at least about 15 seconds; and (c) allowing the emulsion to cool to form a solid chocolate fudge comprising from about 45 to about 60 weight percent water, wherein the emulsion has a pH of about 6.4 to about 7.

8. The method as defined in claim 7, wherein the blend comprises about 45 to about 55 percent water, about 20 to about 30 percent fat, about 2 to 10 percent non-fat dried milk or equivalent milk protein, about 0.2 to about 1.5 percent lecithin, about 5 to about 15 percent cocoa, about 5 to about 15 percent sugar, 0 to about 0.3 percent artificial sweetener, and 0 to about 0.3 percent flavoring; and wherein the emulsion has a pH of about 6.6 to about 6.8.

9. A method for preparing an ultra high temperature processable non-chocolate fudge comprising: (a) homogenizing a blend comprising about 45 to about 60 percent water, about 15 to about 45 percent fat, about 1 to 15 percent non-fat dried milk or equivalent milk protein, about 0.1 to about 3 percent lecithin, about 0.1 to about 5 percent modified starch, 0 to about 45 percent sugar, 0 to about 1 percent artificial sweetener, and 0 to about 1 percent flavoring; (b) heating the emulsion under ultra high temperature conditions of about 250 to about 300° F. for at least about 15 seconds; and (c) allowing the emulsion to cool to form a solid non- chocolate fudge comprising from about the same amount of water as the blend prior to heating the blend, wherein the emulsion has a pH of about 6.4 to about 7.

10. The method as defined in claim 9, wherein the blend comprises about 45 to about 55 percent water, about 20 to about 30 percent fat, about 1 to 10 percent non-fat dried milk or equivalent milk protein, about 0.2 to about 1.5 percent lecithin, about 2 to about 4 percent modified starch, about 10 to about 25 percent sugar, 0 to about 0.5 percent artificial sweetener, and 0 to about 0.5 percent flavoring; and wherein the emulsion has a pH of about 6.6 to about 6.8.

11. A self-supporting fudge comprising about 45 to about 60 percent water, about 15 to about 45 percent fat, about 1 to about 15 percent non-fat dry milk or equivalent milk protein, about 0.1 to about 3 percent lecithin, and about 0.1 to about 20 percent water binder, wherein the fudge has been cooled from a flowable heat processable fudge blend comprising from about 45 to about 60 percent water and which has been pasteurized at about 250 to about 300° F. for at least about 15 seconds and the heat processable fudge blend being cooled to provide a self-supporting fudge at room temperature.

12. The fudge according to claim 11, wherein the water binder is selected from the group consisting of cocoa, starch, modified starch, gums, fibers, maltodextrin, and combinations thereof.

13. The fudge according to claim 11, wherein the fudge is a chocolate fudge comprising about 45 to about 60 percent water, about 15 to about 45 percent fat, about 1 to 15 percent non-fat dried milk or equivalent milk protein, about 0.1 to about 3 percent lecithin, about 0.5 to about 20 percent water binder, 0 to about 45 percent sugar, 0 to about 1 percent artificial sweetener, and 0 to about 1 percent flavoring; wherein the water binder is cocoa; and wherein the fudge has a pH of about 6.4 to about 7.

14. The fudge according to claim 13, wherein the chocolate fudge comprises about 45 to about 55 percent water, about 20 to about 30 percent fat, about 2 to 10 percent non-fat dried milk or equivalent milk protein, about 0.2 to about 1.5 percent lecithin, about 5 to about 15 percent water binder, about 5 to about 15 percent sugar, 0 to about 0.3 percent artificial sweetener, and 0 to about 0.3 percent flavoring; and wherein the fudge has a pH of about 6.6 to about 6.8.

15. The fudge according to claim 11, wherein the fudge is a non-chocolate fudge comprising about 45 to about 60 percent water, about 15 to about 45 percent fat, about 1 to 15 percent non-fat dried milk or equivalent milk protein, about 0.1 to about 3 percent lecithin, about 0.1 to about 5 percent water binder, 0 to about 45 percent sugar, 0 to about 1 percent artificial sweetener, and 0 to about 1 percent flavoring; wherein the water binder is a modified starch; and wherein the fudge has a pH of about 6.4 to about 7.

16. The fudge according to claim 15, wherein the non-chocolate fudge comprises about 45 to about 55 percent water, about 20 to about 30 percent fat, about 1 to 10 percent non-fat dried milk or equivalent milk protein, about 0.2 to about 1.5 percent lecithin, about 2 to about 4 percent water binder, about 10 to about 25 percent sugar, 0 to about 0.5 percent artificial sweetener, and 0 to about 0.5 percent flavoring; and wherein the fudge has a pH of about 6.6 to about 6.8.

17. The fudge according to claim 11, wherein the heat processable fudge is pasteurized under ultra high temperature conditions.

18. The fudge according to claim 12, wherein the heat processable fudge is pasteurized under ultra high temperature conditions.

19. The fudge according to claim 14, wherein the heat processable fudge is pasteurized under ultra high temperature conditions.

20. The fudge according to claim 16, wherein the heat processable fudge is pasteurized under ultra high temperature conditions.

21. A method for preparing a self-supporting fudge, the method comprising: (a) homogenizing a blend comprising about 45 to about 60 percent water, about 15 to about 45 percent fat, about 1 to about 15 percent non-fat dry milk or equivalent milk protein, about 0.1 to about 3 percent lecithin, and about 0.1 to about 20 percent water binder to form an emulsion; (b) heating the emulsion at a temperature and time sufficient for pasteurization in a closed system; and (c) allowing the emulsion to cool to form a self-supporting fudge comprising about the same amount of water as the emulsion prior to pasteurization.

22. The method according to claim 21 wherein the closed system is a scraped surface heat exchanger.

23. The method according to claim 22 wherein the emulsion is pasteurized at about 250 to about 300° F. for at least about 15 seconds and then is cooled to provide a self-supporting fudge at room temperature.

* * * * *